United States Patent Office 3,577,487
Patented May 4, 1971

3,577,487
PREPARATION OF SUBMICRON SIZED ALKALINE EARTH TITANATE AND ZIRCONATE POWDERS
Moises Gali Sanchez, Severna Park, Newton Levy, Jr., Ellicott City, and Richard R. Rettew, Laurel, Md., assignors to W. R. Grace & Co., New York, N.Y.
No Drawing. Filed May 22, 1968, Ser. No. 731,306
Int. Cl. C04b *33/32;* F27b *9/04*
U.S. Cl. 264—56                                                4 Claims

ABSTRACT OF THE DISCLOSURE

Highly reactive, high purity, submicron sized alkaline earth titanates and zirconates are prepared by first blending hydroxides, nitrates, etc. and hydrogels and then passing the resulting product through a fluid energy mill.

---

This invention relates to a process for the preparation of fine-sized ceramic powders and bodies at significantly lower temperatures by thermal decomposition and/or dehydration of intimately mixed precursors as solutions, pastes, slurries or powders.

It has been shown that fine-sized powders exhibit rather unique properties when compared to powders of the same composition but of larger size. These smaller particles are known to sinter to high densities at lower temperatures, to form solid solutions at lower temperatures, and to form strong ceramic bodies by virtue of their smaller grain size leading to reproducible and enhanced final properties. The sub-micron particles are difficult to obtain by conventional techniques and prohibitively expensive in raw material and processing costs. Wet chemical preparative techniques may lead to problems in washing, filtering, drying, preventing agglomeration and comminuting aggregates.

In addition, when a single phase, multi-component oxide powder is desired, the same problems exist with respect to the size and the processing of the powders, along with the difficulties in achieving stoichiometry and complete homogeneity. Co-precipitation or co-decomposition may yield powders with the desired properties; but, again, these methods are generally limited in their application and often economically unattractive.

Since the solid state reaction between two or more inorganic oxides is usually diffusion controlled, then shorter diffusion paths would lead to more homogeneous products at less severe heat treatments. Therefore, one would expect the solid solution to be kinetically favored with extremely small particles in very intimate contact. The conventional method of physically blending and comminuting component oxides rarely produces sub-micron particles or homogeneity on a submicron scale.

Alkaline earth titanates and zirconates find applications in electronic ceramics, positive temperature coefficient materials, superconductor materials, thermal coatings, pigments, catalyst bases, etc. The composition depends on the ultimate use, and other materials are frequently added to modify, improve or extend certain properties. The additives may include, but are not restricted to compounds of La, Bi, Sn, Pb, Na, K, Ge, Nb, Ta, Fe, and Co.

In a typical ceramic processing of $BaTiO_3$, the raw materials, $BaCO_3$ and $TiO_2$, are blended by wet or dry ball milling, spray dried, calcined between 1100–1300° C., comminuted and finally fabricated by dry pressing, followed by sintering in an oxidizing atmosphere at 1300–1450° C. Doped barium titanates are most commonly prepared by blending of the individual titanate and zirconate powders or by use of the appropriate carbonates and oxides in the beginning of the process.

The disadvantages of this conventional process are evident from the beginning. The raw materials, $BaCO_3$ and $TiO_2$, are seldom obtained in a submicron particle size, thereby precluding submicron $BaTiO_3$ particles and making homogeneity on a submicron scale very questionable. The high calcination temperature necessary to achieve the $BaTiO_3$ phase leads to exaggerated growth of the $BaTiO_3$ particles and to severe interparticle agglomeration. This, in turn, necessitates further comminution where impurities can be introduced in the milling steps. Furthermore, the severe thermal treatment yields relatively inactive surfaces requiring high sintering temperatures for densification and giving ceramic bodies of undesirably large grains. The methods presently used to dope $BaTiO_3$ do not give completely homogeneous and reproducible bodies.

It is therefore an object of this invention to prepare homogeneous, high purity, fine-sized titanates and zirconates by a process wherein the deired phases are formed at significantly lower temperatures from intimately mixed precursors. This and other objects of the invention will become apparent from the following detailed descriptions are specific examples.

Broadly the process comprises forming intimately mixed precursors of the alkaline earth titanates and zirconates and thereafter feeding this homogeneous and fine-particled mixture into a fluid energy mill wherein the mixture is subjected to thermal decomposition or dehydration. Highly reactive, homogeneous and submicron sized powders result which require no further comminution and are capable of being processed into ceramic bodies under less severe conditions.

Although the preferred fine-sized powders of this invention are the alkaline earth titanates of barium or strontium and mixtures of barium titanate with alkaline earth zirconates such as barium, calcium, or magnesium, various other alkaline earth titanates and zirconates as well as mixtures thereof fall within the scope of the invention. The process is equally applicable for the preparation of other fine-sized ceramic materials such as alkaline earth stannates, aluminates, germanates, plumbates, hafnates, etc.

The ceramic powders are prepared from cation salts and hydrogels. The alkaline earth compounds should be decomposable salts which are relatively water soluble or capable of being solubilized or decomposed; for example, hydroxides, nitrates, carbonates, formates, acetates or other carboxylates as well as citrates and oxalates. Because of their availability and desirable physical and chemical characteristics, the use of alkaline earth hydroxides and nitrates is preferred.

In one embodiment of this invention doped barium titanate compositions may be prepared by impregnating pure $BaTiO_3$ with one or more decomposable salts of the required species, e.g., salts of zirconium, calcium, magnesium, barium, etc. Whenever it is desired to further modify the properties of the titanates and zirconates, additives may be employed. In such an instance, decomposable compounds of elements such as niobium, lanthanum, tin, rare earths etc. are added to the mixtures prior to fluid energy milling.

The hydrogels utilized in the process of this invention are titania and zirconia. By a hydrogel, it is meant an oxide, usually amorphous, containing more water than the highest water containing compounds of the elemental oxide.

These hydrogels may be prepared by any of several satisfactory methods well known to those skilled in the art. Preferably hydrogels are prepared from the metal chlorides, e.g., $TiCl_4$ or $ZrOCl_2 \cdot 8H_2O$ and ammonia and washed free of the chloride ion. Hydrogels with very desirable properties are obtained if the precipitation is carried out in a hydrous oxide reactor. Here the precipitation is carried out under very intensive mixing conditions and on a continuous basis. The resulting products are homogeneous and finely divided precipitates.

The process of this invention is very versatile so that a variety of compositions may be prepared. Therefore the operable ranges of concentration of each the reactants depends entirely on the final properties desired.

The intimately mixed precursors of the alkaline earth titanates and zirconates are formed by blending and ageing the starting materials. Thus the hydroxides and hydrogels may be blended together to yield a homogeneous paste. Blending may be accomplished in any suitable mixing device such as mix muller, commercial blender, stirred tank, hydrous oxide reactor, etc. A subsequent ageing step further solubilizes the hydroxides and drives the reaction to near completion at temperatures less than 100° C. at atmospheric pressure. The reaction temperatures may vary from about 20 to 100° C., preferably from about 75 to 95° C. In the same manner, the ageing step may range from about 0.1 to 4 hours, preferably from 0.25 to 1.0 hour. The ageing time and temperature may be adjusted in such a manner as to yield powders with varying particle sizes in the 0.02–1.0 micron range.

Unlike prior art methods involving hydrothermal preparations of titanates and zirconates, characterized by the use of high temperatures under pressure, the mixed oxides of the present invention at this stage of the process have never been thermally treated over 100° C. and yet are homogeneous and fine-particled pastes or slurries. The latter features of the pastes and slurries are the desirable characteristics of the feed media to the fluid energy mill. Although any suitable device giving a satisfactory powder can be used to process the pastes or slurries, it has been found that the fluid energy milling of the titanate precursors yields superior titanate powders less than 0.1 micron in size with surface areas ranging from 10–50 $m.^2/g.$ The fluid energy mill is a standard article of commerce and is modified to operate at temperatures high enough to effect the necessary decomposition and/or dehydration to the mixed oxide containing powders. The feed material for the high temperature fluid energy mill may either be in the form of a solution, paste, slurry or a solid mixture. If solid mixtures are to be fed to the mill the previously formed slurry or paste is dried to a flowable powder. The powder is then fed to the mill.

It has been found that when operating an 8 inch high temperature fluid energy mill for example, it is convenient to feed the slurry or paste at a rate of 5 to 300 ml. per minute and preferably about 120 to 220 ml. per minute. Solids can be fed at rates of 50 to 300 grams per minute, preferably about 100 to 200 grams per minute. The mill conditions depend on the surface properties desired. The temperature of operation of the mill is normally 500 to 1500° F. inlet, in hot air, preferably 500 to 800° F. Mixtures can also be milled in steam.

The mill yields homogeneous and highly pure sub-micron sized titanate and zirconate powders possessing extremely high surface activity. The powders require no further comminution and can be processed by calcining to prevent excessive shrinkage on firing while maintaining the desirable sub-micron sizes. The high reactivity of the single-phased titanate and zirconate systems lowers the calcination and sintering requirements. Unlike in prior art methods, calcination may be accomplished at a temperature of about from 500 to 1100° C., and preferably 700 to 900° C. for periods of 1 to 5, preferably from 2 to 3 hours.

The calcined mixture may be shaped in any desirable way, e.g., cold pressed discs and thereafter subjected to sintering. The powders sinter to near theoretical density at 100° C. or more below that required for conventional barium titanate. The firing temperature depends on the physical properties desired, with a temperature range of about 1000 to 1400° C., and preferably 1200 to 1300° C., for from 1 to 4 hours, preferably for 2 hours.

The process of this invention yields powders which are homogeneous, highly sinterable and readily dispersed in liquid media. Ceramic bodies fabricated from these powders exhibit small grain sizes, good uniformity, and improved properties.

The process is versatile and due to the minimum processing steps a wide variety of compositions may be prepared possessing high purity.

This invention is illustrated, but not limited by the following specific examples.

EXAMPLE I

The titania hydrogels were precipitated from aqueous titanium tetrachloride and ammonia on a continuous basis. The two solutions were fed separately into a hydrous oxide reactor and were mixed intensively at about 3000 r.p.m. once the desired pH value was obtained. The resultant slurry was spray dried and washed with a dilute ammonia and ammonium nitrate solution followed by deionized water until essentially chloride free. The washed hydrous titania cake is then utilized in the synthesis of the various titanates.

Pure barium titanate was prepared by blending 2.03 kg. of R. G. $Ba(OH)_2 \cdot 8H_2O$ and 1.18 kg. of a titania hydrogel containing 43.4 w/o $TiO_2$ in a mix-muller until a homogeneous paste was formed. Additional $H_2O$ was added to maintain a soupy consistency, suitable for feeding to the mill. The mixture was then fluid energy milled in air at 550° F. inlet and 400° F. outlet temperature, and 125 ml./min. feed rate. The milled powder was found to have a BET surface area of 50 $m.^2/g.$ and an X-ray diffraction crystallite size of less than 0.02 micron. The powder was calcined at 900° C. and the surface area was 12 $m.^2/g.$ with an average crystallite size of 0.05 micron.

For fabrication, the powder was calcined at 900° C. for one hour, dry pressed at 50,000 p.s.i., and sintered at 1250° C. for 2 hours. The sintered body had a percent theoretical density of 96%, a room temperature dielectric constant of 1800, a Curie pt. dielectric constant of 6500 at 118° C. and a dissipation factor of 0.6% at room temperature.

EXAMPLE II

A mixture of 2,222 g. of $Ba(OH)_2 \cdot 8H_2O$, 835 g. of $TiO_2$ hydrogel (33.00% volatiles) and 609 g. of water were mulled in a sealed mix muller for 66 hours. The mull was then aged at 65° C. for 52 hours. The aged mull was then dried under a partial vacuum at 80° C. with a slow stream of dry, $CO_2$ free, air. The dried $BaTiO_3$ was then milled in air with a grind temperature of 560° F. and an outlet temperature of 400° F.

The product had a surface area of 10.7 $m.^2/g.$ The surface areas of powders calcined at 300° C., 500° C. and 700° C. for 2 hours were 14.7 $m.^2/g.$, 13.6 $m.^2/g.$ and 8.60 $m.^2/g.$ The crystallite size as measured by X-ray line broadening techniques on the green powder was 0.10 micron. After calcination for 2 hours at 300, 500, and 700° C., the material had a crystallite size of 0.12 micron, 0.12 micron and 0.14 micron respectively. After calcination at 700° C. for 2 hours, pressing at a pressure of 50,000 p.s.i. and firing at 1250° C. for 2 hours, a percent theoretical density of 97% was attained.

EXAMPLE III

A barium titanate powder prepared as indicated in Example II was impregnated after milling. 400 gms. of powder containing 4.14% volatiles was mixed with 167 gms. of an aqueous nitrate solution containing a Ca/Zr mole ratio of 1.00 and about 20 w/o solids as $CaO \cdot ZrO_2$. The mixture was dispersed with 250 gms. of deionized $H_2O$ in a commercial blender until a thick creamy paste was obtained; the nominal composition was .9 $BaTiO_3$-.1 $CaZrO_3$. Excess $NH_4OH$ was added and the paste was milled at 700° F. inlet and 500° F. outlet temperature. The powder obtained was calcined at 700° C. for 2 hours and had a BET S.A. of 8.6 m.²/g. The powder was fabricated as above and had the following electrical properties: $K_{TC}=8900$, $K_{25}=3450$, $DF_{TC}=1.85\%$, $DF_{25}=3.15\%$, $T_C=67°$ C.

EXAMPLE IV

Another calcium zirconate impregnated barium titanate was synthesized in the following manner:

A mixed $TiO_2$-$ZrO_2$ hydrogel was prepared in a manner similar to Example I from an aqueous mixed chloride solution and $NH_4OH$, the cake washed free of $Cl^-$ ion. 1.16 kg. of the cake, containing 31.6% solids as $$ZrO_2 \cdot TiO_2$$

and a Ti/Zr mole ratio of .90/.10, was mix-mulled with 1.23 kg. of 99.0% $Ba(OH)_2 \cdot 8H_2O$ and 42.4 gm. of 97.4% $Ca(OH)_2$ at room temperature for 4 hours. The paste was then fluid energy milled at 1400° F. inlet and 800° F. outlet temperature in steam. The powder obtained had a BET surface area of 20 m.²/g. and the perovskite X-ray diffraction pattern. The powder was calcined for 1 hour at 925° C., cold pressed at 50,000 p.s.i. and sintered two hours at 1250° C. The sintered body had a density of 5.4 gm./cc., a Curie temperature of 79° C., a $K_{TC}$ of 3300, a $K_{25}$ of 2400 and a room temperature loss factor of 2.05%.

EXAMPLE V

Barium titanate was impregnated with barium zirconate to give a nominal composition of 0.9 $BaTiO_3$-0.1 $BaZrO_3$. A solution of 62.25 g. of $Ba(OH)_2 \cdot 8H_2O$, 16 g. concentrated nitric acid, 105.3 g. $ZrO(NO_3)_2$ containing 21.46 w/o $ZrO_2$ and approximately 220 g. of water was added to 400 g. of a barium titanate powder prepared as indicated in Example II. The mixture was agitated vigorously in a Waring Blendor for 3–4 minutes until a thick uniform, creamy paste was formed. After rapid addition of 100 ml. of concentrated ammonia, the paste was mixed thoroughly for approximately 5 minutes. The paste was fluid energy milled in steam at 750° F. inlet and 500° F. outlet temperature and 100 ml./min. feed rate. The powder obtained was calcined at 700° C. for 2 hours and was found to have an X-ray diffraction crystallite size of approximately 0.1 micron, and the perovskite structure.

EXAMPLE VI

A nominal composition of 0.927 $BaTiO_3$-0.07 $CaZrO_3$-0.003 $Nb_2O_3$ was made in the following manner:

A mixed $TiO_2$-$ZrO_2$-$Nb_2O_5$ hydrogel was prepared in a manner similar to Example IV from an aqueous mixed chloride solution and $NH_4OH$ and the cake washed free of $Cl^-$ ion. 571 g. of the mixed hydrogel containing 31,98 w/o solids as $ZrO_2 \cdot TiO_2 \cdot Nb_2O_5$; 630 g. of R.G. 99.4 w/o $Ba(OH)_2 \cdot 8H_2O$ and 14.8 g. of R.G. 97.4 w/o $Ca(OH)_2$ were mulled at room temperature for 3–4 hours. The paste was then fluid energy milled in steam with a grind temperature of 1300° F. and an outlet temperature of 850° F. at a feed rate of 45 gm./min. The product had a surface area of 18 m.²/g., and was single phase perovskite structure.

EXAMPLE VII

A sample of strontium titanate was prepared by mixing 4.31 kg. of $Sr(OH)_2 \cdot nH_2O$ containing 39.24 w/o SrO, 1.77 kg. of hydrous $TiO_2$ containing 73.84 w/o $TiO_2$, and 2 kg. of deionized $H_2O$ and heating to 90–95° C. in a stirred tank for 3 hours. The slurry was then allowed to settle, decanted, and the cake dried at room temperature. The resulting solid powder was fluid energy milled in hot air at 840° F. inlet, 500° F. outlet, at a feed rate of 150 gm./min. The powder obtained, after calcination at 500° C. for 2 hours, was $SrTiO_3$ from X-ray diffraction, containing about 4% volatiles, and with a crystallite size of approximately .03 micron from X-ray diffraction line broadening.

What is claimed is:
1. A process for making a ceramic dielectric body which comprises the steps of:
    (a) blending barium hydroxide and titania hydrogel to form a homogeneous paste at a temperature of about 20 to 100° C.,
    (b) subjecting said paste to thermal treatment in a fluid energy mill at a temperature of about 500 to 800° F.,
    (c) calcining the milled product at a temperature of about 700 to 900° C. for about 1 to 5 hours,
    (d) pressing the calcined product into the desired shape, and
    (e) sintering the shaped material at a temperature of about 1200 to 1300° C. for about 1 to 4 hours to greater than 95% of theoretical density and finally recovering the product.
2. The process for preparing sub-micron sized barium, calcium, strontium, or magnesium containing powders selected from the group consisting of titanates, zirconates, stannates, aluuminates, germanates, plumbates, hafnates, and mixtures thereof comprising the steps of:
    (a) forming, as solutions, slurries, pastes, or powders, intimately mixed precursors of said sub-micron sized powders, at a temperature of about 20° to about 100° C., by reacting decomposable salts of alkaline earth metals selected from the group consisting of barium, calcium, strontium, and magnesium with decomposable salts of metals selected from the group consisting of titanium, zirconium, tin, aluminum, germanium, lead, hafnium, and mixtures thereof, said decomposable salts being selected from the group consisting of hydrous oxide gels, hydroxides, nitrates, carbonates, formates, acetates, citrates, and oxalates,
    (b) subjecting said precursors to thermal decomposition in a fluid energy mill operated at a temperature of about 500° to about 1500° F. in the presence of air or steam, and
    (c) recovering the sub-micron sized product.
3. The process according to claim 2 wherein decomposable salts selected from the group consisting of hydrous oxide gels, hydroxides, nitrates, carbonates, formates, acetates, citrates, and oxalates of elements selected from the group consisting of rare earths, niobium, calcium, magnesium, tin, tantalum, and lanthanum are added to modify the properties of said titanates and zirconates.
4. The process for making ceramic dielectric bodies comprising the steps of:
    (a) preparing sub-micron sized barium, calcium, strontium, or magnesium containing powders selected from the group consisting of titanates, zirconates, stannates, aluminates, germanates, plumbates, hafnates, and mixtures thereof, by forming as solutions, slurries, pastes, or powders, intimately mixed precursors of said sub-micron sized powders, at a temperature of about 20° to about 100° C., by reacting decomposable salts of alkaline earth metals selected from the group consisting of barium, calcium, strontium, and magnesium with decomposable salts of metals selected from the group consisting of titanium, zirconium, tin, aluminum, germanium, lead, hafnium, and mixtures thereof, said decomposable salts being selected from the group consisting of hydrous oxide gels, hydroxides, nitrates, carbonates, formates, acetates, citrates, and oxalates,
    (b) subjecting said precursors to thermal decomposi- tion in a fluid energy mill operated at about 500° to about 1500° F. in the presence of air or steam,
(c) recovering said sub-micron sized powder,
(d) calcining the milled sub-micron sized powder at a temperature of about 500° to 1100° C. for about 1 to 5 hours,
(e) pressing the calcined product into the desired shape,
(f) sintering the shaped product at a temperature of about 1000°–1400° C. for about 1 to 4 hours to greater than 95% of theoretical density and recovering said sintered product.

References Cited

UNITED STATES PATENTS

| | | | |
|---|---|---|---|
| 3,049,431 | 8/1962 | Russell | 264—66 |
| 3,265,787 | 8/1966 | Brandmayr et al. | 264—56 |
| 3,435,104 | 3/1969 | Brandmayr | 264—66 |
| 3,472,776 | 10/1969 | Derbyshire | 264—66 |

DONALD J. ARNOLD, Primary Examiner

U.S. Cl. X.R.

264—65, 66